UNITED STATES PATENT OFFICE.

ALPHEUS M. BARNES AND WILLIAM F. YOCOM, OF WESTON, MISSOURI.

IMPROVEMENT IN TANNING.

Specification forming part of Letters Patent No. 181,621, dated August 29, 1876; application filed June 20, 1876.

*To all whom it may concern:*

Be it known that we, ALPHEUS MILTON BARNES and WILLIAM FRANKLIN YOCOM, of Weston, in the county of Platte and State of Missouri, have invented a new and Improved Tanning Process, of which the following is a specification:

To begin with, we lime the hides as by the old process, and then bate them as follows: Take one hundred gallons of soft water, put in one and a half (1½) bushel of corn-meal, and let stand until sour. Then bate the hides in it, taking from four (4) to twenty-four (24) hours. Then stone them out, and they are ready for the dress-liquor, which we prepare as follows: To one hundred (100) gallons of soft water add fifty (50) pounds salt, twenty (20) pounds sulphuric acid, two (2) pounds sulphate potash, or two and a half (2½) nitrate potash, and twenty gallons of buttermilk or sour milk. Mix all well, and into this put the hides or skins, and handle them often through the day—small skins from six to twelve hours; large hides from twenty-four to forty-eight hours—thus preparing them for the tan-liquor, which we prepare as follows: Make a weak "handler" of extract-of-bark liquor by adding to each hundred (100) gallons twenty-five (25) pounds of salt, one (1) pound sulphate of potash or nitrate of potash, and ten (10) pounds sulphuric acid, and handle often for the first twenty-four hours to make the color even and set the grain. Then strengthen up gradually with equal proportions of all the ingredients, adding per day, after the second day, about forty (40) pounds of the extract to one hundred (100) gallons of the liquor, and handling the hides every twenty-four hours until the tan strikes through. Then take out and scour thoroughly, thus preparing them for the gambier liquor, which is composed of one pound of gambier to a gallon of water, and handle in this from twenty-four to forty-eight hours, which will free the leather of all chemicals. Then take out and scour, as before, and slick with the steel slick, and handle in a warm weak sumac liquor for six hours, after which take out and finish as by the old process.

Sheep-skins can be tanned by this process in from one to four days; calf and kip, from eight to twelve days; upper and harness, from fifteen to twenty days; and it makes stronger and better leather than the old process.

For tanning hides with the hair and fur on, after thoroughly soaking and breaking them, we put them in the dress-liquor from one to three days; then take out and slick them, and apply on the flesh side a composition of oil and half-strength lye, in the proportion of one (1) gallon of the former to a half (½) gallon of the latter. Then hang up in the shade to dry, and, when dried, take them on the fleshing-beam and work them thoroughly with the fleshing-knife. Then take them on the table, and use the pumice-stone to soften.

Having thus described our invention, we claim as new and desire to secure by Letters Patent—

1. The compositions of the bating-liquor, dress-liquor, and tan-liquor, and the process of tanning therewith, and with the gambier and sumac or liquors, substantially as herein described.

2. The process of tanning hides with the hair and fur on, by subjecting them to action of a dress-liquor prepared as described, and then treating them with a composition of oil and half-strength lye, as herein set forth.

ALPHEUS MILTON BARNES.
WILLIAM FRANKLIN YOCOM.

Witnesses:
GEO. A. WARNER,
J. P. CARTWRIGHT.